Jan. 9, 1968

H. BRECHNA 3,363,207

COMBINED INSULATING AND CRYOGEN CIRCULATING
MEANS FOR A SUPERCONDUCTIVE SOLENOID

Filed Sept. 19, 1966

INVENTOR.
HABIB BRECHNA

BY

ATTORNEY

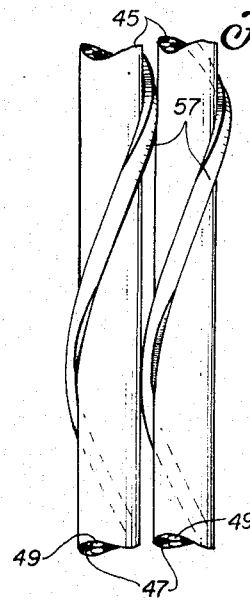
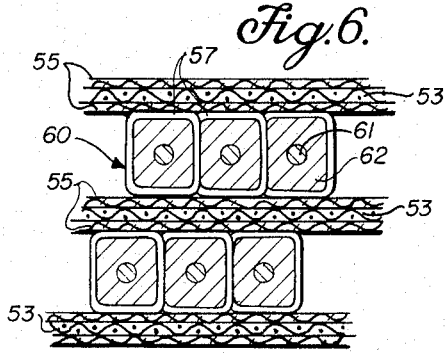
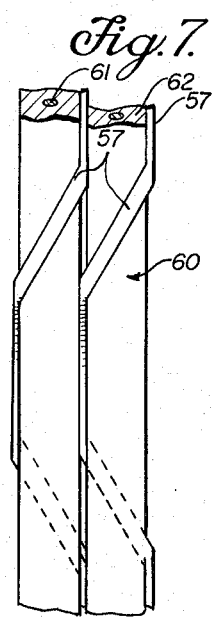
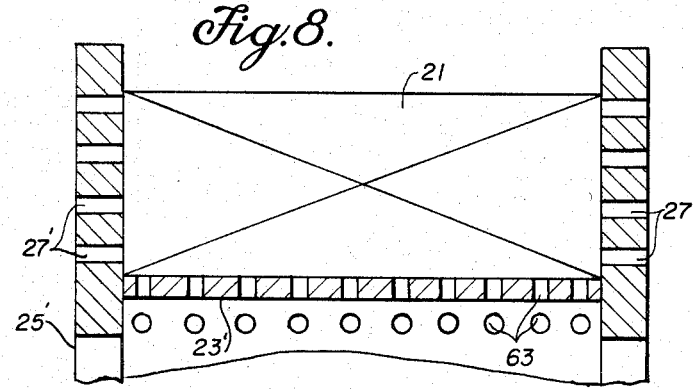
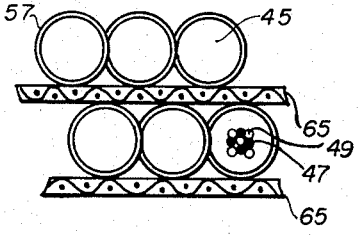
INVENTOR.
HABIB BRECHNA 3,363,207
COMBINED INSULATING AND CRYOGEN CIRCULATING MEANS FOR A SUPERCONDUCTIVE SOLENOID
Habib Brechna, Palo Alto, Calif., assignor to the United States of America as represented by the United States Atomic Energy Commission
Filed Sept. 19, 1966, Ser. No. 580,514
10 Claims. (Cl. 335—216)

This invention was evolved in the course of, or under, Contract AT(04–3)–400 with the United States Atomic Energy Commission.

The invention relates to a multilayer, multiturn superconducting solenoid and more particularly concerns an improved arrangement for efficiently and effectively cooling a compact superconducting solenoid having electrical insulation between turns and layers and being further provided with metallic short circuit paths between layers for dissipation of eddy currents, which insulation and metallic short circuit paths also define channels for circulation of a cryogen.

Briefly, the invention relates to a solenoid wound of a superconducting cable. A small wire or ribbon of high-strength nonferromagnetic material having high electrical resistance, or a wire or ribbon appropriately insulated, is spirally wound around the superconducting cable with a pitch greater than one and generally from two to twenty times the diameter of the small wire or ribbon. Upon winding the cable to form the solenoid the spirals are meshed to electrically insulate adjacent turns and to further provide cooling channels for free flow of cryogen over most of the surface of the cable. The spiral turns also form a strong structure to effectively resist Lorenz forces and thereby maintain the cooling channels open and prevent turn-to-turn short circuits.

Between adjacent layers of the solenoid is arranged a sandwich comprised of an oxidized flexible metallic screen having low electrical resistivity, which screen is positioned between sheets of porous electrical insulation. The ends of the screen are electrically connected to from a single shortcircuited turn between each layer. The sandwich thereby provides electrical insulation between layers, a short-circuit path inductively coupled to the solenoid for dissipation of eddy currents, and a path for free flow of cryogen to the spiral cooling channels and hence to the surface of the cable.

Background of the invention.

Various superconducting materials exhibit substanially zero resistivity and thereofore no resistive losses at low temperatures including niobium-tin, niobium-zirconium, and niobium titanium alloys which are especially suitable as hard superconductors since they exhibit superconducting behaviour even in the presence of high fields and with relative ease may be formed into desirable coil configurations. The zero resistivity of a superconductor exists, however, only for currents less than acritical current $I_c$ which is a function of the temperature of the superconductor and the magnetic field to which it is exposed. When the current in a superconductor rises above the critical value, the superconductor reverts to its normal resistive condition. If either the corruelative temperature $T_c$ or magnetic field $H_c$ value are raised beyond the critical value, the superconductor reverts to its normal condition. Since the factors $T_c$ and $H_c$ are interdependent, the lowering of the magnitude of one factor (the temperature) will permit a higher magnitude of the other (the magnetic field) without loss or quenching of superconductivity. Therefore, since a high magnetic field is desirable, it becomes necessary to operate a superconductor at the lowest possible temperature so that a high current may be recirculated to generate a high magnetic field without destroying the superconducting property. The proper cooling of a superconducting solenoid is determined by distribution of insulation between turns and layers, the composition of the cable and the configuration of the coil, inter alia. Unless properly provided, it is possible that not all of the superconducting cable is in contact with the cryogen and consequently, any flux jumping may result in local quenching with Joule heating propagating progressively from local to adjacent areas to quench the whole coil. The structure of the invention provides efficient and effective cooling in order that a current near the critical current may be recirculated to obtain the highest possible magnetic field economically.

It is known to make superconducting cable of superconducting material surrounded by a substrate of normal metal of low electrical resistivity such as copper, silver, or aluminum to overcome localized heat effects. The normal metal provides a heat sink for ohmic losses on reversion which result from localized heating of the superconductor and further provides a shunt current path for the current which is diverted by the resistance of the reverted area of the superconductor until that area of the superconductor is again cooled below its critical temperature. In addition to protection against normalization or reversion of local areas, the normal substrate provides partial protection against a sudden general collapse of the solenoid field which, if uncontrolled, could destroy the solenoid. During such a collapse, the substrate provides a medium for circulation and dissipation of shunting currents, thereby converting the energy of the collapsing magnetic field harmlessly to heat.

In a solenoid, the greater the ratio of normal material to superconductor and the more surface exposed to the cryogen, the better the protection against reversion of local areas and a rapidly collapsing solenoid field. However, the more normal material that is used, the lower the space factor, i.e., the ratio of cross-sectional area of superconductor to total cross-sectional area of the solenoid. By effective and efficient cooling of the superconducting cable the amount of normal conductor material in the cable may be advantageously reduced without loss of protection against formation of normalized areas in a fluctuating magnetic field. Moreover, it is desirable to provide between turns and layers of a superconducting solenoid electrical insulation having substantially greater resistivity than the substrate around the superconductor to avoid shunt currents and ensure a reasonable charging time. One known method for providing turn to turn insulation in a superconducting solenoid is to wind an organic material around the entire surface of the superconducting cable. Another known method, such as disclosed in U.S. Patent No. 3,187,235, is to wind a small high resistance wire in bifilar fashion with the superconducting cable, which small wire is sufficient to separate the turns of the solenoid. In either of these known arrangements, however, the insulation tends to block the flow of cryogen over part of the superconducting cable; and further, in high field solenoids, the Lorenz forces act on the cable to compress the insulation to completely block the flow of cryogen between turns. Lorenz forces are the result of interaction between the magnetic field of the solenoid and the current through the cable. The solenoid field includes a main field and leakage flux. This causes a resultant force having radial and axial components acting on the cable. It is desirable, therefore, to provide between turns a configuration of insulation which is not adversely affected by Lorenz forces and permits cryogen to flow over most of the surface of the superconducting cable at all times.

As further protection against a suddenly collapsing magnetic field in a superconducting solenoid, it is known, as described in an article, "Superconducting Magnets," page 105, IEEE Spectrum, February 1964, to provide a short-circuited solid metal foil, such as copper, between coil layers. The foil provides a short-circuit path inductively coupled to the coil (in addition to the copper in the superconducting cable) for circulation of eddy currents to dissipate the energy of the collapsing field. It is further known as also described in the above-mentioned article, to insulate the metal foil from adjacent superconducting cable by means of solid layers of Mylar ®. The impervious metal foil and Mylar ® layer however, further tend to hinder the flow of cryogen over the superconducting cable and thereby prevent effective and efficient cooling of the solenoid.

Description of the invention:

Among the obects of the invention are to provide a new and improved superconducting solenoid; to effectively and efficiently cool a superconducting solenoid; to electrically insulate the layers and turns of cable in a superconducting solenoid by a compact arrangement which also enables a free flow of cryogen over the surface of the cable; to electrically insulate the layers of cable in a superconducting solenoid and provide a path between layers for dissipation of secondary currents by an arrangement which also enables a free flow of cryogen over the surface of the cable; to increase substantially the shunt resistance between turns and layers and thereby minimize the charging time of a superconducting solenoid; and to develop high magnetic fields by means of a compact superconducting solenoid whose structure is highly resistive to deforming Lorenz forces.

Other objects and advantageous features of the invention will be apparent in a description of a specific embodiment thereof, given by way of example only, to enable one skilled in the art to practice the invention more readily, and described hereinafter with reference to the accompanying drawing, in which:

FIGURE 5 is a top view of a portion of two adjacent turns of the superconducting solenoid of FIGURE 4 showing the position of the ribbon spirals;

FIGURE 6 is a cross-sectional view of a portion of a superconducting solenoid wound of superconducting cable that is of rectangular cross section and is spirally wrapped with a ribbon of material having high electrical resistance;

FIGURE 7 is a top view of a portion of two adacent turns of the superconducting solenoid of FIGURE 6 showing the position of the ribbon spirals;

FIGURE 8 is a cross-sectional view of a portion of a superconducting solenoid arranged for immersion in a cryogen; and FIGURE 9 is a cross-sectional view of a superconducting solenoid whose layers are separated only by an anodized aluminum screen.

Figure 1:
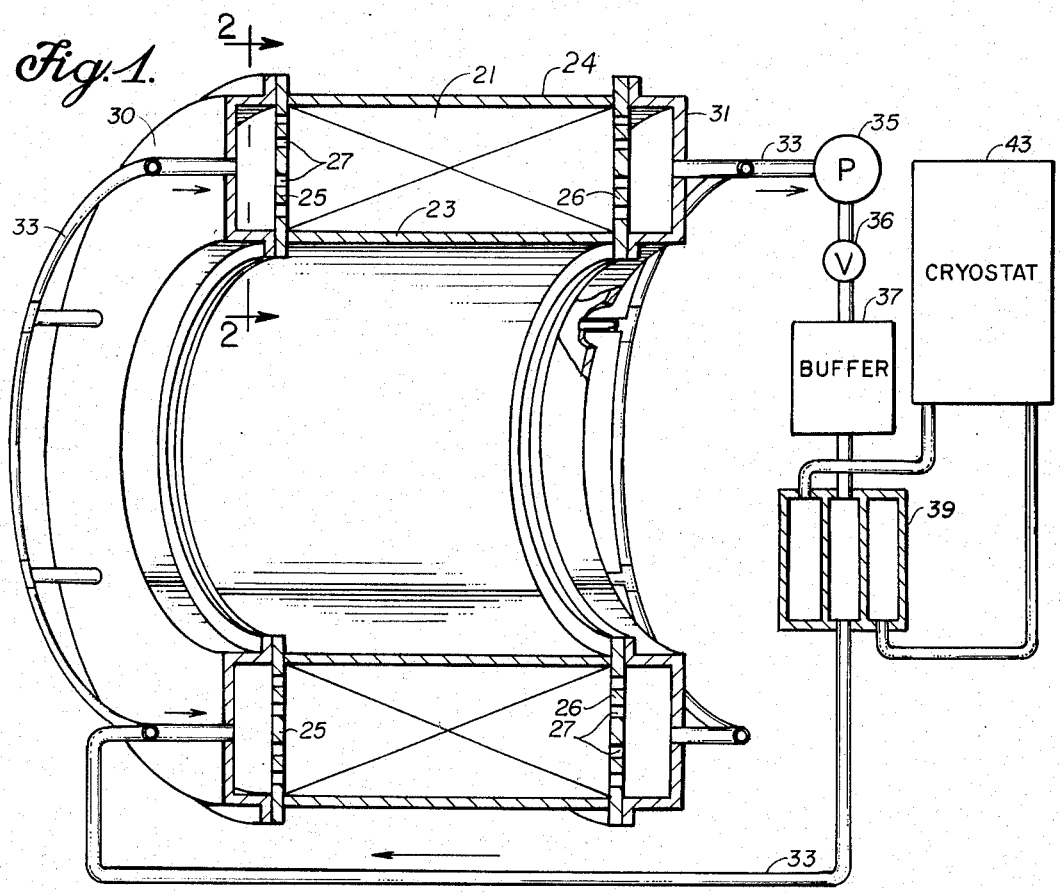
FIGURE 1 is a diagram partially in cross section of a pressurized cooling system for a superconducting solenoid according to the invention.

Referring to the drawing, a recirculating pressurized cooling system for maintaining a superconducting solenoid 21 below its critical temperature is shown diagrammatically in FIGURE 1. The solenoid 21 is wound on a form 23. End plates 25 and 26 are suitably attached to form 23 and a shell 24 to maintain the turns of the solenoid in place and to provide rigid support and confined space for the solenoid. Secured to the outer surface of the sides 25 and 26 are ducts 30 and 31 connected at various points to piping 33 serially connected to a pump 35, valve 36, buffer 37, and heat exchanger 39. The buffer 37 is a pressurized tank of cryogen which, upon being connected into the system, immediately pressurizes the cryogen in the entire system to a supercritical state in which there is no substantial difference between the liquid and gaseous states of the cryogen. To enable the cryogen to circulate through the solenoid each of the sides 25 and 26 are provided with holes 27 which connect the ducts 30 and 31 to cooling paths between layers and turns of the solenoid 21, which paths are fully described hereinafter. One pattern for the holes is shown in FIGURE 2 which is a view of a portion of the end plate 25 looking in the direction of the arrows 2—2. The holes of this pattern are disposed in successive radial columns with each column offset from each adjacent column.

By means of the above-described pressurized cooling system, a cryogen, such as liquid helium, is continuously supplied to the duct 30 at a temperature near 0° K. and at a flow rate adequate to maintain the temperature of of the solenoid below the critical value. The cryogen is circulated through the solenoid 21 to extract heat therefrom, and then returned to the heat exchanger via the pump, valve and buffer. The heat exchanger 39 is connected to a cryostat 43 to automatically maintain the temperature of the cryogen at the desired cryogenic temperature. In order to reduce heat losses by conduction the entire system may be suitably enclosed in a vacuum chamber (not shown) or the system may be provided with adequate insulation such as supercold or other cryogenic insulation well known in the art.

Liquid helium is a preferable cryogen for the pressurized cooling system due to the inability of liquid helium to undergo a phase change under high pressures (such as 10 atmospheres at 4.2° K.). In such a pressurized state, helium is in a super crticial state, where effectively no difference in the gaseous and liquid states is encountered. Helium has by nature a low viscosity which allows it to easily penetrate through small cooling channels to the superconducting solenoid.

Figure 3:
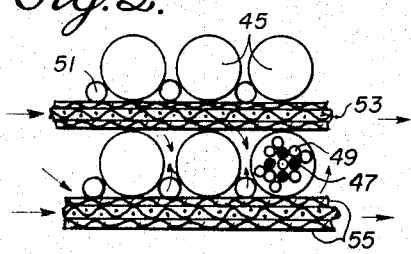
FIGURE 3 is a cross-sectional view of a portion of a superconducting solenoid wherein electrical insulation is provided between turns and layers and cooling paths and electrical short-circuit paths are provided between layers.

The described pressurized closed loop cooling system includes cooling passages for the flow of cryogen through the solenoid 21. These passages are shown in FIGURE 3. In this arrangement, a superconducting cable 45 comprises superconductor strands 47 interwoven with copper strands 49 and dipped in indium to provide a unitary bonded structure. The cable 45 is wound in bifilar fashion with a spacer wire 51 of material having high electrical resistance such as nichrome or manganin wire to provide electrical insulation and cooling space between turns and in addition a short-circuit path for dissipation of eddy currents. To increase the electrical insulating quality of the spacer wire and further reduce the charging time of the solenoid, the spacer wire may be provided with a thin coating of insulation such as adhesive resin, e.g., epoxy.

Between layers of the solenoid 21 an insulating sandwich structure is provided which is comprised of an oxidized metallic screen 53 between sheets 55 of porous electrical insulation such as fiberglass cloth. The sheets of cloth electrically insulate each layer of the solenoid from the adjacent layers and from the metallic screen. The screen must essentially be of low electrical resistivity to provide an excellent short circuit path, inductively coupled to the solenoid, for effective dissipation of eddy currents.

The sandwich of cloth and screen is arranged on the form 23 to have the edges coincide or at least overlap and communicate at many points with the holes 27 (FIGURES 1 and 2) in the end plates 25 and 26. A path for free flow of cryogen from the duct 30, through the sandwich over the cable and to the duct 31 is thereby provided, even though the screen and cloth may be arranged to take up only a relatively small amount of space between turns due to the nature of the screen and insulation. For the purpose of the invention the screens are made of strands interwoven at right angles, all of which strands are electrically connected by soldering or other means at the crossover points. Such a screen defines interstices which permit free liquid flow in the plane of the screen as well as free flow normal to the screen, especially, from the duct 30 through the holes 27 to the screen and the duct 31. Also, the cryogen is free to flow vertically through the layers of porous insulation 55 to contact the cable 45 and spacer wire 51. Most effectively, the ends of the screen in each layer are cleared of any insulation so as to be electrically bare and then overlapped to provide a single short-circuited turn inductively coupled to the solenoid. Winding pressure usually provides enough electrical contact to produce a short-circuit path for the eddy currents.

It is possible, especially in a thin compact sandwich, that various stresses to which the glass cloth is subjected during winding of the solenoid and during operation thereof will separate the cloth. Such separation would allow portions of the superconducting cable to come into contact with the screen and possibly establish a short-circuit to an adjacent or other turn of the solenoid. By using a metallic screen such as copper that is oxidized or aluminum which is anodized prior to formation into the sandwich, an added degree of protection is obtained against such short-circuits by the oxide coating which will furter insulate the screen from the superconducting cable. Furthermore, the oxide coating does not significantly increase the thickness of the sandwich and easily conducts heat from the screen during dissipation of secondary currents. Alternatively, the screen could be coated with a thin layer of electrical insulation such as adhesive resin, glyptal varnisher or other insulating coating; however, such a coating does not provide the uniform and tough covering of an oxide coating and in addition would not provide the good heat conduction path that is obtained with the oxide. Instead of a metal screen, it is contemplated that flexible sheets of other types of metal could be embossed to permit liquid flow in the plane of the sheet and punched to permit liquid flow in the radial directions; metallic screens, however, are widely available, compact, flexible, relatively inexpensive and provide all of the advantages described.

As further protection against separation of the cloth within the solenoid and to prevent fraying of the edges of the cloth when it is cut, it is advantageous to dip and lightly coat the cloth in a very thin solution of polyester, glyptal varnisher, or adhesive resin such as epoxy. No catalyst is added to the solution. This results in a flexible coating when the solution dries that protects against separation and fraying of the cloth yet preserves the electrical insulation character of the cloth. However, unless the solution is removed from the interstices of the cloth before it is dried, the cloth becomes impervious to the flow of cryogen. To maintain the porosity of the cloth, a stream of air before the solution dries is directed to remove the surplus of the solution from the interstices. Alternatively, heating the cloth also causes the solution to clear from the interstices. In either process, the interstitial pores of the cloth are thereby maintained to provide easy passage of the cryogen.

Although the bifilar winding shown in FIGURE 3 is relatively simple to construct, certain disadvantages arise in its use. The spacer wire 51 restricts free flow of cryogen in the radial direction. Furthermore, the spacer wire does not adequately resist deforming forces in the horizontal direction. This is due to the point of contact between the spacer wire 51 and superconducting cable 45 being along an outer edge of each layer rather than along the central axis of the layer. Such an arrangement leaves the upper portion of each turn of superconducting cable relatively free to move toward the adjacent turn of cable when the solenoid is subjected to a horizontal force, thereby possibly causing a turn-to-turn short circuit. Furthermore, any shifting of the cable 45 due to a horizontal force tends to wrinkle and separate the adjacent sheet of cloth 55.

Figure 4:
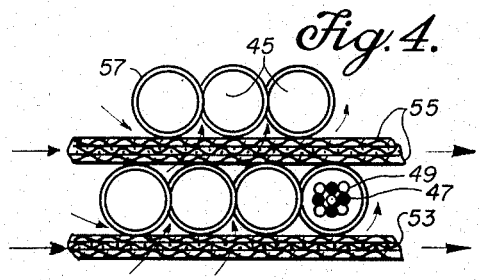
FIGURE 4 is a cross-sectional view of a portion of a superconducting solenoid wound of superconducting cable that is spirally wrapped with a ribbon of material having high electrical resistance.

An improved arrangement that overcomes these disadvantages is shown in cross section in FIGURE 4. In this arrangement, prior to winding the superconducting cable 45 into a solenoid, the cable may be spirally wrapped with the spacer wire 51 or with a wire of rectangular cross section such as a thin ribbon 57. The spiral ribbon or wire optionally may be coated with insulation such as epoxy. A top view of adjacent cables of the arrangement of FIGURE 4 is shown in FIGURE 5 with the ribbon 57 spirally wrapped around the cable 45. Each spiral should have sufficiently wide spaces between its turns to permit the spirals on adjacent solenoid turns to mesh therewith and still provide space for vertical flow (in FIGURE 4) of the cryogen over the surface of the cable 45. By using a spiral spacer wire or ribbon, as may be seen by reference to FIGURES 4 and 5, cooling paths are formed which permit the free flow of cryogen in all directions over nearly the entire surface of the cable 45. Since the spirally wrapped spacer wire or ribbon contacts adjacent cable turns along the central axis of each layer, horizontal forces, especially Lorenz forces, are successfully resisted to prevent contact of adjacent turns or wrinkling and possible separation of the cloth 55. Very high Lorenz forces may be resisted by small pitch spiral turns.

The wire ribbon 57, of rectangular cross-section, is preferable to a circular wire. The flat sides of the ribbon do not deform the superconducting cable as would a circular wire, and because of the resulting stability a closer spacing of the superconducting cable may be obtained.

The spiral ribbon in combination with the sandwich between layers enables the building of a superconducting solenoid that is compact yet one which may be efficiently and effectively cooled to achieve stability during recirculation of large electrical currents for generation of a high magnetic field.

Another superconducting solenoid arrangement in which improved protection against local reversions in the superconducting cable is provided as shown in FIGURES 6 and 7. In this arrangement, a superconducting cable 60 of rectangular cross section is wound into a solenoid. A sandwich of screen 53 between sheets of porous electrical insulation 55, as described hereinbefore, is provided between layers of the solenoid.

The cable 60 comprises a central core 61 of superconducting material encased by a normal conductor metal 62 such as copper. The central core may be either solid superconductor or comprised of strands of superconductor dipped in indium. The square cross section of the cable 60 exposes a larger area to the cryogen and permits the use of a greater mass of copper for a heat sink while the total volume of the solenoid remains equal to the same solenoid wound with cable of circular cross section.

Since the cable 60 may be spirally wrapped with the spacing ribbon 57, as described before in regard to the cable 45, such a solenoid is effectively and efficiently cooled. The rectangular cross section of the cable 60 also results in a solenoid in which all turns and layers are firmly placed against adjacent turns and layers. The cable 60 therefore remains securely in place despite any deforming forces which in other arrangements could cause a shifting of the cable.

Figure 2:
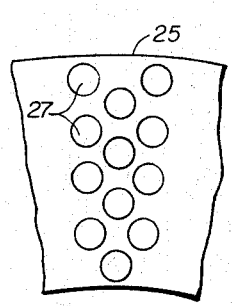
FIGURE 2 is a partial end view of the superconducting solenoid of FIGURE 1 taken along lines 2—2.

A superconducting solenoid arranged to have cooling passages such as described in the arrangements shown in FIGURES 3–7, is suitable to be cooled by immersion in a container of liquid cryogen as well as by the pressurized cooling system described hereinbefore with reference to FIGURE 1. When cooled by immersion, the pressurized cooling system including the outer shell 24 and ducts 30 and 31 are removed, and a form 23' (FIGURE 8) with sides 25' is provided for solenoid 21. Holes 27' are provided in the sides for axial flow of the cryogen to the superconducting cable, and the form 23' is provided with holes 63 to permit radial access of the cryogen to the solenoid.

In a modified embodiment of the invention, the porous cloth may be omitted and the insulation provided solely by an oxide film directly on the screen. For example, an anodized aluminum screen 65 (FIGURE 9) alone may be substituted for the sandwiches of porous insulation 55 and metal screen 53 indicated in FIGURES 3, 4 and 6. An anodized aluminum screen of an oxide coating one micron thick ($10^{-4}$ cm.) will withstand voltages from 200–300 volts. Such a coating, which also is tough, durable and uniform over the screen, may be obtained by dipping the aluminum screen in basic solutions or be electrically anodized. Due to the configuration of the screen, the cryogen flows both axially and transversely to the superconducting cable as discussed hereinbefore in regard to the sandwiches shown in FIGURES 3, 4 and 6. The packing factor of the superconducting cable 45 or 60, however, is improved by the elimination of the insulation material 55.

Practical embodiments of the solenoids have ranged in length from 4″ to 10″, having outside diameters from 2½″ to 8″, inside diameters from ⅜″ to 3″, with 200 to 1,000 turns in 20 to 50 layers wound of circular superconducting cable of 36 mil to 0.1″ diameter (commercially available from Atomics International, Canoga Park, Calif. and from Supercon, Natick, Mass.). The solenoids were operated with currents up to 440 amps to obtain central fields from 20 to 75 kilogauss.

One 500 turn −10 layer solenoid was built utilizing square superconducting cable of 60 mil sides resulting in a solenoid 2.7″ long with and outside diameter of 2.4″ and an inside diameter of 1″. At 270 amps a central field of 40 kilagauss was obtained.

The layers of the above solenoids were separated by a sandwich of oxide coated aluminum or copper screen 15 to 20 mil thick between two sheets of 7 to 10 mil thick open weave glass cloth. In some instances the glass cloth was treated with a thin solution of epoxy resin adhesive without a hardener and then air dried. The spacing wires were manganin or nichrome 10 mil thick. The spacing ribbons were 5 to 10 mil thick and 50 mil to ⅛″ wide. One solenoid was constructed only with an oxide coated aluminum screen between layers as shown in FIGURE 9.

While there has been described what may be considered to be preferred embodiments of the invention, modifications may be made therein within the scope of the invention as defined in the appended claims.

What is claimed is:

1. In a superconducting solenoid, the combination comprising:
   (a) a solenoidal coil of superconducting cable wound to have multiple layers in proximate spaced relation and multiple turns in proximate spaced coextensive relation;
   (b) cryogen reservoir means;
   (c) a system for applying the cryogen in cooling relation to said solenoid;
   (d) a structural arrangement for separating and supporting each layer of said coil, said arrangement including,
      a sheet of conductive material having a low electrical resistivity and forming a short-circuited turn, said sheet defining interstitial openings normal to the sheet and which interconnect in the plane of the sheet,
      first and second porous layers of electrical insulation to either side of said sheet,
      said arrangement electrically insulating adjacent layers of said coil and providing passages for flow of the cryogen to the superconducting cable and further providing an electrical short circuit path inductively coupled to said coil.

2. A superconducting solenoid according to claim 1 wherein said first and second porous layers of electrical insulation are fiberglass cloth to provide passages for the cryogen to flow to the superconducting cable and to electrically insulate the layers of superconducting cable from said sheet of material and further to provide electrical insulation between layers of said coil.

3. A superconducting solenoid according to claim 2 wherein the fibers of said fiberglass cloth are provided with a thin coating of adhesive resin with the interstices being open.

4. A superconducting solenoid according to claim 1 wherein said sheet of material having a low electrical resistivity is a metallic screen comprising interwoven strands to provide axial and radial passages for the cryogen to flow to the superconducting cable.

5. A superconducting solenoid according to claim 4 wherein a pair of opposite edges of said screen are overlapped, and in electrical conductive pressure contact.

6. A superconducting solenoid according to claim 1 wherein said structural arrangement is comprised solely of a single short-circuited layer of metallic screen having an oxide coating.

7. A superconducting solenoid according to claim 1, further including: an elongated member of relatively small cross section and high electrical resistance wound in spirals on said superconducting cable and supporting adjacent turns of said solenoid to maintain their proximate spaced relationship, the spirals having a pitch greater than one diameter of said member, said superconducting cable being wound to intermesh the spirals so as to bring the spirals on each turn of cable into contact with each adjacent turn of cable to maintain their proximate spaced relationship so as to define cooling channels therebetween which interconnect to said adjacent structural arrangements to conduct cryogen over the superconducting cable.

8. A superconducting solenoid according to claim 7 wherein said elongated member is of rectangular cross section and is spirally wound around said cable with one side substantially flat against said cable to securely space and electrically insulate adjacent turns and to provide cooling channels therebetween.

9. A superconducting solenoid cooled according to claim 7 wherein the cryogen is helium and is applied to said coil by said system which includes, a heat exchanger, means for automatically maintained said heat exchanger substantially below the temperature at which helium liquifies, means for recirculating the helium from said heat exchanger through said arrangements separating the layers of said coil, through the cooling channels defined by the spirals and the superconducting cable and back to said heat exchanger, and a buffer for applying a pressure to the helium in said system to maintain the helium in a supercritical state.

10. A superconducting solenoid cooled according to claim 9 wherein said system includes, a pair of end plates enclosing the ends of said coil, said plates having a plurality of successive offset radial columns of holes formed therein to permit a substantial number of holes to be at least partially aligned with said arrangement separating the layers of said coil, said holes opening into said system for recirculation of the cryogen therethrough.

References Cited

UNITED STATES PATENTS

| 3,281,738 | 10/1966 | Hanak | 335—216 |
| 3,292,016 | 12/1966 | Kafka. | |
| 3,332,047 | 7/1967 | Borchert | 335—216 |

BERNARD A. GILHEANY, *Primary Examiner.*

GEORGE HARRIS, Jr., *Examiner.*